June 20, 1950
A. J. SORENSEN
2,512,391
METER COMPENSATING FOR DIAMETER
OF CONDUCTOR UNDER TEST
Filed Sept. 4, 1947
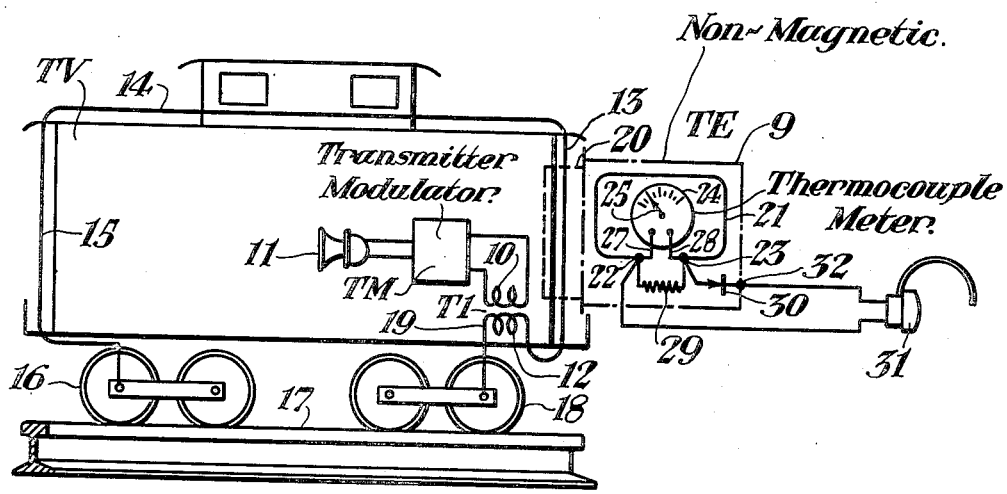
Fig. 1.
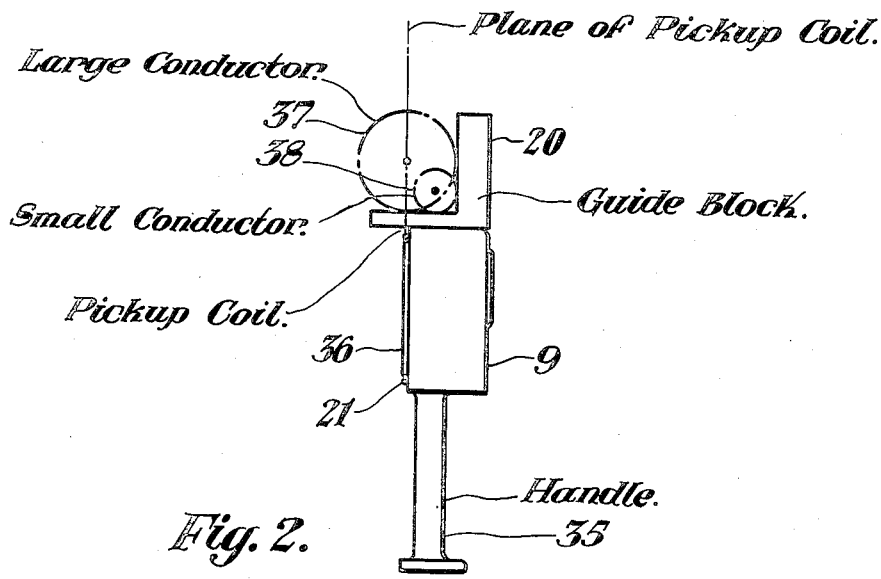
Fig. 2.
INVENTOR.
Andrew J. Sorensen.
BY
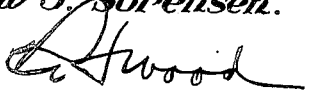
HIS ATTORNEY Patented June 20, 1950

2,512,391

UNITED STATES PATENT OFFICE 2,512,391

METER COMPENSATING FOR DIAMETER OF CONDUCTOR UNDER TEST

Andrew J. Sorensen, Edgewood, Pa., assignor to The Union Switch & Signal Company, Swissvale, Pa., a corporation of Pennsylvania Application September 4, 1947, Serial No. 772,139

3 Claims. (Cl. 171—95)

My invention relates to test equipment for communication systems, and more particularly to equipment for checking the operability of a transmitter of a carrier inductive communication system.

The present application is a continuation-in-part of my copending application for Letters Patent of the United States, Serial No. 729,713, filed February 20, 1947, for Test Equipment for Communication Systems, now abandoned, insofar as the subject matter common to the two is concerned.

Inductive carrier communication systems for vehicles, such as, for example, inductive carrier communication systems for railway trains are in general use. In such systems transmission is effected through a trackway channel that includes a line wire or other conductors extending along the trackway. The equipment mounted on a vehicle includes a loop circuit to which the vehicle transmitter is connected for sending from the vehicle. Current flowing in the transmitting loop circuit is effective to inductively create an electromotive force in the parallel line wire, and this electromotive force causes current to flow in the trackway transmitting channel and which current in turn influences receiving apparatus coupled to the transmitting channel at remote points. This transmitting loop circuit is usually made of a relatively large area and comprises one or more turns of wire or pipe mounted on the vehicle in a vertical plane. The magnitude of the electromotive force induced in this transmitting loop circuit in the wayside conductors depends upon the amount of current flowing in the transmitting loop circuit. The current is of a carrier frequency which is modulated by voice frequencies for transmission of speech. To assure reliable operation of the system, it is necessary to check the magnitude of the current flowing in the transmitting circuit and also to check the presence of modulation. Such checking is generally done just before the vehicle starts on a trip over the trackway. For example, in railway train communication systems, the apparatus on a train is checked at the terminal or yard as the locomotive or caboose or car on which the equipment is mounted is being prepared for a trip.

In view of these circumstances, a main object of my invention is the provision of novel and improved equipment for testing the operability of a transmitter of a carrier communication system.

A feature of my invention is the provision of an inductive type test meter having a guide so that the indication obtained from a given current flowing in a conductor is substantially the same regardless of the size of the conductor.

A more specific feature of my invention is the provision of test equipment of the type here involved which is portable and of simple construction and wherewith a maintainer can quickly and easily test the operability of a transmitter of a modulated carrier current without disturbing any circuit connections.

Other features, objects and advantages of my invention will appear as the specification progresses.

The foregoing objects, features and advantages of my invention are obtained by the provision of a portable instrument which comprises in one case a pick-up coil, an indicating meter and a detector. The pick-up coil consists of one or more turns of wire mounted in the instrument to inductively receive an electromotive force due to the magnetic field created about a conductor carrying the communication current, the instrument case being designed so that the coil can be readily positioned close to a straight portion of the conductor carrying the current. The meter is of the type responsive to carrier current and is connected to the pick-up coil to measure the value of the electromotive force and thereby indicate the operability of the transmitter supplying current to the conductor. The pick-up coil and meter are characterized by the meter reading being substantially independent of the frequency of the communication current. The detector is connected to the pick-up coil to detect the modulation of the carrier, the output of the detector being supplied to a telephone receiver, such as an earphone, so that the maintainer can check the presence of modulation at the same time that the operability of the transmitter is being indicated by the meter.

Due to the fact that any conductor acts substantially as though the current was concentrated at the physical center of the conductor, even though the current is distributed through a small portion of the material at the outside of the conductor, a guide block is mounted on the instrument case for positioning the instrument with respect to the conductor. When the meter is used, the case is placed adjacent the conductor for the conductor to rest in a corner of the guide block. Thus for a conductor of relatively large diameter, the center of the conductor will be in or near the plane of the coil and when the conductor is of relatively small diameter the center of the conductor is nearer the coil but at the same time out of the plane of the coil. In this way the larger conductor is favored as far as its center being in the plane of the coil and a small conductor is favored as far as the proximity of its center to the coil. The guide block is positioned with respect to the plane of the pick-up coil so that the meter reading is approximately the same regardless of the size of the conductor.

For a better understanding of my invention, reference may be had to the accompanying drawings, of which Fig. 1 is a diagrammatic view showing one form of test equipment embodying my invention when used with railway train communication systems, and Fig. 2 is a side view of the instrument of the test equipment of Fig. 1, showing the arrangement of the guide block for positioning the instrument adjacent a conductor.

It is understood that the invention is not limited to this one application, and the use of the test equipment in a train communication system illustrates the many places the equipment is useful.

Referring to Fig. 1, the reference character TV represents a vehicle of a railway train such as, for example, a caboose of a freight train, and on which vehicle train communication apparatus is mounted. This apparatus would include a transmitter-modulator TM for sending communication current from the vehicle. This transmitter-modulator is shown conventionally for the sake of simplicity since it may be any one of several well-known arrangements. For example, the transmitter-modulator TM may be similar to the corresponding apparatus shown in Letters Patent of the United States No. 2,064,639, granted December 15, 1936, to Leland D. Whitelock et al., for Communicating Systems, or it may be similar to the structure disclosed in an application for Letters Patent of the United States, Serial No. 575,311, filed January 30, 1945, now Patent No. 2,484,680, granted October 11, 1949, by Paul N. Bossart, for Railway Train Communication Systems.

It is sufficient for the present application to point out that the transmitter-modulator TM includes an electron tube oscillator for supplying a carrier of a given frequency, means to modulate the oscillations and means to supply the modulated carrier to an output transformer at a given energy level. By way of illustration, I shall assume that the transmitter supplies a carrier current of the order of 80 kc. and that this current is frequency modulated by voice frequencies created by speaking into a microphone 11, and this frequency modulated carrier current is then amplified and supplied at a desired energy level to primary winding 10 of an output transformer T1.

A secondary winding 12 of output transformer T1 is connected to a transmitting loop circuit which here is shown as including a vertical conductor 13 at the right-hand end of the vehicle, a horizontal conductor 14 mounted along the top of the vehicle, a vertical conductor 15 at the left-hand end of the vehicle, a pair of vehicle wheels 16, the track rails 17, a pair of wheels 18 and wire 19 back to the secondary winding 12. In the drawing only one rail and one wheel of each pair of wheels is shown, but it is to be understood that these elements are of the usual construction. This transmitting loop circuit is mounted in substantially a vertical plane for inductive relation with line wires and other conductors paralleling the track rails. It is clear that the communication current flowing in this transmitting loop circuit will create a magnetic field having the frequency and modulation of the current and this field will have a given intensity when the transmitter is functioning at its normal output.

It is to be understood that the transmitting loop circuit mounted on the vehicle TV may not include the track rails but may be completed by a horizontal conductor extending along the under side of the vehicle body. Also, the dimensions of this transmitting loop circuit may be smaller than that indicated in the drawing and it may not include substantially the entire vehicle body.

The reference character TE indicates as a whole the test equipment or instrument embodying the invention. This test equipment includes a case indicated by a dot and dash rectangle 9 which may be of any suitable non-magnetic material. Preferably one side of this case 9 is provided with a guide block 20 which is designed, as will appear hereinafter, so that the instrument may be placed along side a conductor of the transmitting loop circuit, such as the conductor 13, with the conductor having a definite spacing with respect to the instrument.

A pick-up coil 21 is formed inside or around the case and may comprise one or more turns of wire secured to the case in any suitable manner. The terminals of the coil 21 are connected to terminal posts 22 and 23 secured in the case. It follows that with the case 9 placed along side the conductor 13 when communication current is flowing in the transmitting circuit, a corresponding electromotive force is induced in the pick-up coil 21 and appears across terminals 22 and 23.

The equipment TE also includes an indicating meter 24 which is mounted in the case 9 and has its terminals connected to terminals 22 and 23 of the pick-up coil by lead wires 27 and 28. This meter 24 is preferably of the thermocouple type which is effectively responsive to carrier current of the frequency here involved. While a thermocouple type of indicating meter is preferred, it is to be understood that the invention is not limited to this type of indicating meter and other forms of meters which are responsive to carrier current can be used.

The meter 24 is provided with a needle 25 which moves over a scale 26. The scale 26 is preferably calibrated for the reading of the needle to indicate the amount of current flowing in the transmitting loop circuit.

Since the train communication system may be a multiple channel system using two or more different carrier frequencies and the transmitter-modulator TM made capable of supplying current of any one of the different carrier frequencies, the test equipment TE must be able to check the operability of the transmitter-modulator on all the different carriers. That is, the reading of the meter 24 must be independent of the carrier frequency. It is to be noted that the electromotive force induced in the pick-up coil 21 is proportional to the amount of current flowing in the transmitting loop and to the frequency of the current. Also, the impedance of the pick-up coil 21 is proportional to frequency. Furthermore, the current flowing in the meter 24 is proportional to the impedance of the circuit formed by the coil 21 and meter 24 as well as to the electromotive force induced in the coil 21. The impedance of coil 21 is made relatively high compared to that of meter 24 and the coil is proportioned for its increase in impedance with an increase in frequency to approximately counterbalance the increase of the electromotive force induced in coil 21 due to a corresponding increase in frequency of the carrier current and the current flowing in meter 24, that is, its reading, is substantially independent of frequency of the carrier current.

A shunt resistor 29 is preferably connected across terminals 22 and 23 to aid in calibrating the meter 24.

For the most part the transmitting loop circuit is made up of an insulated pipe having an outside diameter of the order of two inches. The circuit conductor is made of such construction in order that it can withstand mechanical abuse and can also be used as a hand rail for the benefit of the train crew. At unexposed points the circuit conductor may be an insulated copper wire of relatively small diameter. To obtain the same meter reading regardless of the size of the conductor, the instrument is preferably constructed as shown in Fig. 2.

Looking at Fig. 2, which illustrates a preferred form of instrument in practicing the invention, the case 9 is constructed with a handle 35 and at the back with a shoulder 36 on which the pick-up coil 21 is mounted. A guide block 20 is secured to the top of the case 9 in any convenient manner, the block 20 being preferably L-shaped and of non-magnetic insulating material. The block 20 is positioned so that the largest conductor that will ordinarily be used in the circuit with which the test equipment will be used, will have its center substantially in the plane of the pick-up coil 21 when the instrument is held with the conductor in the corner of the guide block 20, such a large conductor being illustrated at 37. A smaller conductor of the circuit under test will fit more into the corner of the guide block 20 when the instrument is held against such smaller conductor, a smaller conductor being illustrated at 38.

As pointed out hereinbefore, a conductor acts substantially as though the current was concentrated at the physical center of the conductor although the current when of high frequency is distributed for the most part near the surface of the conductor. With the instrument constructed as shown in Fig. 2, the large conductor of the circuit under test will have its center substantially in the plane of the pick-up coil but relatively far from the coil whereas a small conductor will have its center nearer the pick-up coil but displaced to one side of the plane of the coil. I have found that by proper proportioning of the parts, the reading of the meter is approximately the same regardless of the size of the conductor for a given value of current flowing in the conductor.

To check the presence of modulation, a detector in the form of an asymmetric unit, such as a half wave rectifier element 30, is mounted in the instrument case. The asymmetric unit 30 is connected between terminal 23 of the pick-up coil 21 and another terminal 32 secured to the case. An earphone 31 is connected between the terminal 32 and the other terminal 22 of the pick-up coil by a suitable cable so that a maintainer can wear the earphone as he carries the instrument. This asymmetric unit 30 may be any suitable type and may be a copper oxide rectifier element.

If the instrument TE is held close to the transmitting loop circuit and someone speaks into the microphone 11, this speech can be heard in the earphone 31 provided the transmitter-modulator TM is functioning properly. This detection of the presence of modulation is due to the fact that a considerable amount of amplitude modulation is found in the energy output because of the variation of the impedance of the transmitting loop circuit with frequency. If the frequency modulation action fails in the transmitter TM, the resultant output energy to the loop circuit becomes an unmodulated carrier, and no speech will be detected in the earphone. Although a simple half wave rectifier element is used for detecting modulation, it is apparent that other forms of a detector can be used by properly matching it with the circuit elements.

In practicing the invention, the maintainer would first start the transmitter-modulator TM and then place the instrument TE along side a straight portion of a conductor of the transmitting loop circuit, and the approximate energy level of the output of the apparatus is indicated on the meter of the instrument TE, and the presence of modulation is indicated in the earphone when someone speaks into the microphone.

Due to the construction of the instrument case and guide block, the meter reading will be approximately the same for a given energy level of the transmitter with the instrument held adjacent a large diameter portion or against a small diameter portion of the transmitting loop circuit. The transmitter-modulator TM would be set at its different conditions one after the other to check its operation at the different carrier frequencies. In this way a complete test of the operating condition of the vehicle transmitting apparatus can be made quickly while the vehicle is being prepared for a trip and without disturbing the connections of the circuit elements.

Although I have herein shown and described but one form of test equipment for communication systems embodying my invention, it is understood that various changes and modifications may be made therein within the scope of the appended claims without departing from the spirit and scope of my invention.

Having thus described my invention, what I claim is:

1. In combination, an air core coil mounted in such a manner as to be adapted of being positioned adjacent a conductor carrying alternating current to inductively receive an electromotive force in response to the current flowing in the conductor, an L-shaped guide block secured to said coil mounting to determine the position of the coil with respect to the conductor, said guide block disposed on said mounting for one leg of the block to lie in a plane parallel to the axis of the coil and at a given distance from the outside of the coil and for the other leg of the block to lie in a plane parallel to the plane of the coil and a given distance to one side of the coil, the parts being positioned for the center of a conductor of a given relatively large diameter to be approximately in the plane of the coil and a given distance therefrom when the guide block is positioned with the conductor lying in the interior angle of the L-shaped block and for the center of a conductor of a diameter smaller than said given diameter to be to one side of the plane of the coil but nearer to the coil than said given distance when the guide block is positioned with the smaller conductor lying in the interior angle of the guide block, said positioning of the parts being such that the electromotive force induced in the coil is directly proportional to the value of the alternating current flowing in the conductor adjacent which the coil is placed regardless of the size of the conductor, and a meter having connection to said coil to indicate the value of said electromotive force.

2. In test equipment for a system using a carrier current which is modulated at times by a given frequency band and which current is supplied to circuit conductors of different diameters, an air core coil mounted on a six-sided case of nonmagnetic material, said coil positioned for the plane of the coil to lie parallel to a given side of the case, an L-shaped guide block mounted on a side of said case at right angles to said given side, said guide block mounted with one of its legs in a plane parallel to the axis of the coil and above the coil and with its other leg in a plane parallel to the plane of the coil and to one side of the coil, said coil and guide block being further positioned for the center of a conductor of a given relatively large diameter to be approximately in the plane of the coil and a given distance therefrom when the guide block is positioned with the conductor lying in the interior angle of the guide block and for the center of a conductor of a diameter smaller than said given diameter to be to one side of the plane of the coil but nearer to the coil than said given distance when the guide block is positioned with the smaller conductor lying in the interior angle of the block, said positioning of the coil and guide block being of such an arrangement that the electromotive force induced in the coil is directly proportional to the value of the carrier current flowing in the conductor adjacent which the coil is placed regardless of the size of the conductor, an indicating meter responsive to carrier current housed in said case and connected across the terminals of said coil to measure said electromotive force, a resistor connected across said coil terminals; and said coil, meter and resistor characterized for their impedance to vary in such a manner as to compensate for variations in said electromotive force due to the frequency variations when the carrier current is modulated.

3. In test equipment for a system using an alternating current which is supplied to conductors having different diameters, a cubical-shaped case of nonmagnetic material, an air core coil secured to the case with the plane of the coil parallel to a given side of the case, an L-shaped guide block of non-magnetic material, said guide block secured to a side of said case at right angles to said given side, said guide block positioned for one leg to be at right angles to said given side and its other leg to be in a plane parallel to but one side of said given side to place the plane of said other leg a given distance to one side of the plane of said coil and at right angles to the axis of the coil, said case with said coil and guide block mounted thereon adapted to be positioned adjacent a conductor with the conductor lying along the interior angle of the guide block the parts being proportioned in such a manner that the center of a given relatively large diameter conductor is approximately in the plane of said coil and a given distance from the axis of the coil and a given relatively small diameter conductor is to one side of the plane of the coil but less than said given distance from the axis of the coil, said proportioning of the parts being such that the electromotive force induced in the coil in response to a given value of alternating current flowing in the conductor is substantially the same regardless of the diameter of the conductor, and an electromotive force measuring meter housed in said case and having connection to said coil.

ANDREW J. SORENSEN.

REFERENCES CITED

The following references are of record in the file of this patent:

UNITED STATES PATENTS

| Number | Name | Date |
|---|---|---|
| 1,254,288 | Stewart | Jan. 22, 1918 |
| 1,675,889 | Kishpaugh | July 3, 1928 |
| 2,064,642 | Bossart | Dec. 15, 1936 |
| 2,146,555 | Arey | Feb. 7, 1939 |

FOREIGN PATENTS

| Number | Country | Date |
|---|---|---|
| 279,544 | Germany | July 10, 1913 |

OTHER REFERENCES

TM 11-620, pages 17 and 34, Jan. 1, 1944. (Copy on file in Patent Office.)